(No Model.) 2 Sheets—Sheet 2.
W. F. STEWART.
WATER FILTER.
No. 586,345. Patented July 13, 1897.
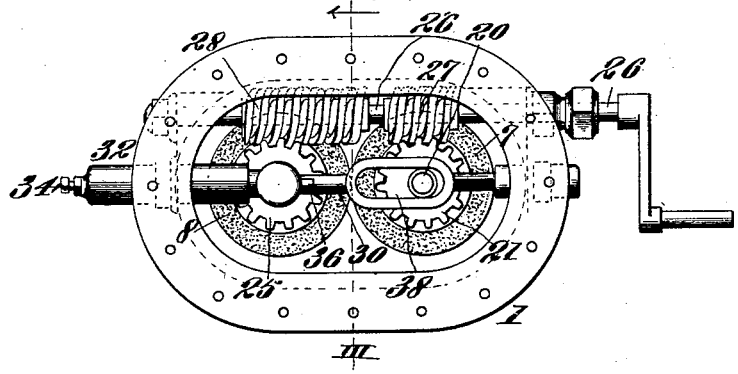
Fig. II.
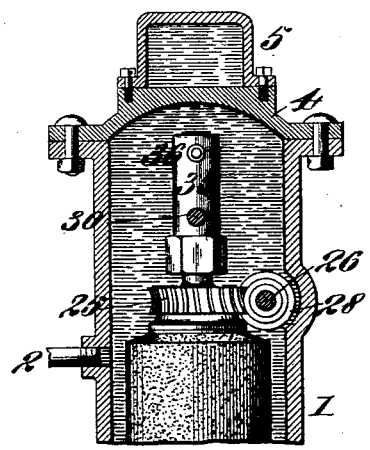
Fig. III.
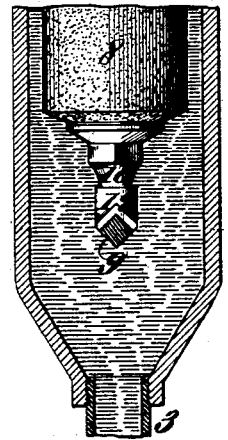
Attest:
O. Finley
E. Knight
Inventor:
Wm. F. Stewart
By Wright Bros.
attys.
THE NORRIS PETERS CO., PHOTO-LITHO., WASHINGTON, D. C.

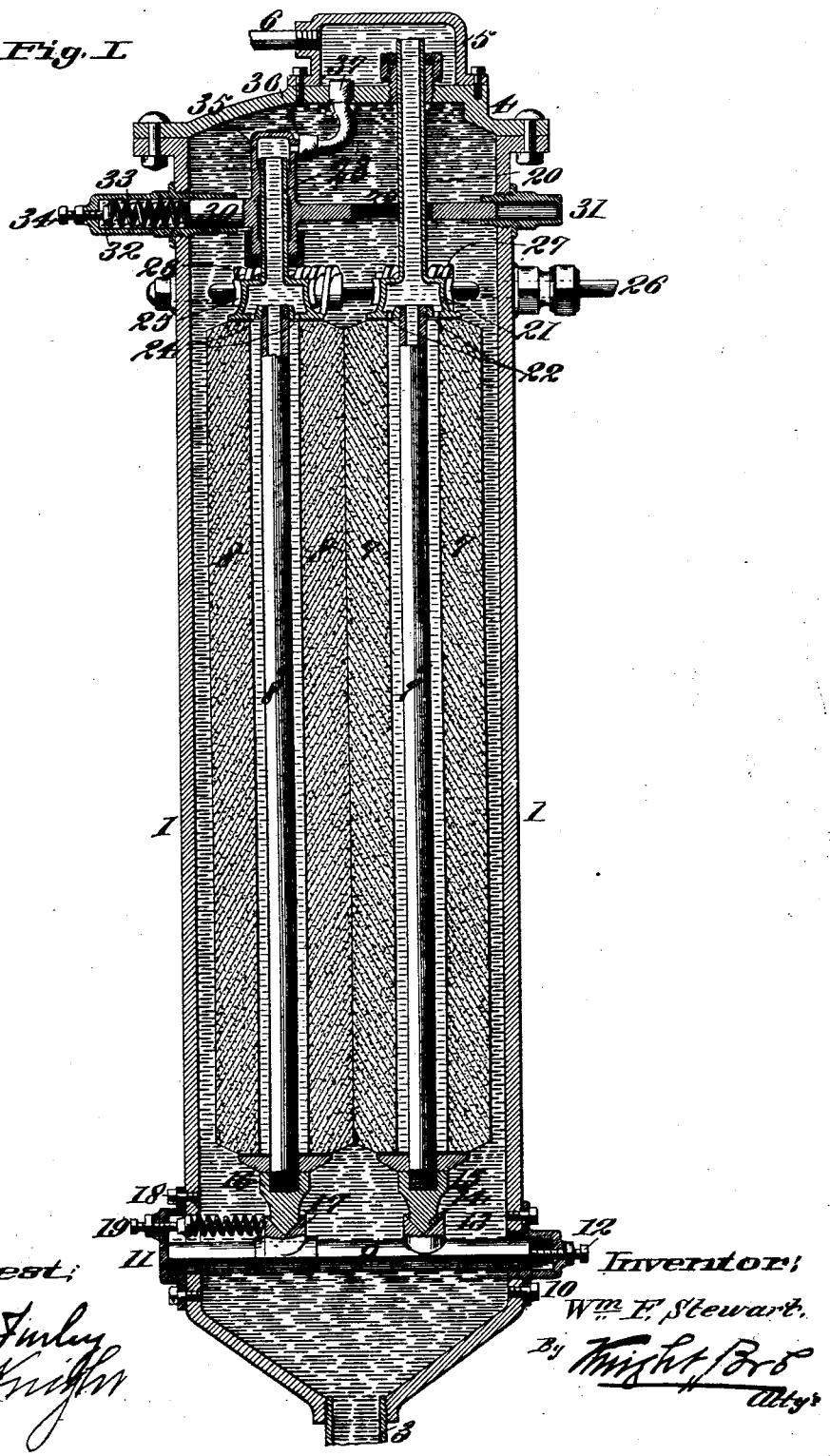

UNITED STATES PATENT OFFICE.

WILLIAM F. STEWART, OF ST. LOUIS, MISSOURI.

WATER-FILTER.

SPECIFICATION forming part of Letters Patent No. 586,345, dated July 13, 1897.

Application filed September 11, 1896. Serial No. 605,513. (No model.)

*To all whom it may concern:*

Be it known that I, WILLIAM F. STEWART, of the city of St. Louis, in the State of Missouri, have invented a certain new and useful Improvement in Water-Filters, of which the following is a full, clear, and exact description, reference being had to the accompanying drawings, forming a part of this specification.

My invention relates to that class of water-filters employing porous blocks or cylinders as a filtering medium; and the essence of the invention lies in the manner of cleaning the filtering blocks or cylinders.

My invention consists in features of novelty hereinafter fully described, and pointed out in the claims.

Referring to the drawings, Figure I illustrates a vertical section through the filter. Fig. II is a top view of the filter with the cap-plate removed. Fig. III illustrates a vertical section taken on line III III, Fig. II, and looking in the direction indicated by the arrow at such line, the central portion of the filter being broken out.

In the drawings, 1 designates the filtering-tank, and 2 the inlet-pipe connected at its side. 3 designates the flushing-outlet, through which the dirty water may be drained from the tank after cleansing the filtering-cylinders. The upper end of the tank is provided with a cap-plate 4, and surmounting the cap-plate 4 is a chamber 5, into which the filtered water is conveyed on production. The chamber 5 has an outlet-pipe 6 connected to it, through which the filtered water may be conveyed for use.

7 and 8 designate the filtering-cylinders, preferably of porous stone, such as tripoli, which are located side by side and arranged to contact with each other. In the lower end of the tank 1 is a non-cylindrical bar 9, supported in boxes 10 and 11 at opposite sides of the tank. The boxes 10 and 11 are removably secured to the tank, in order that seats may be formed in them for the neat reception of the bar 9, so that said bar may be prevented from play when in place, and with the further object of permitting the insertion and removal of the bar 9 to or from the tank.

Passing through the box 10 is a set-screw 12, the end of which bears against the end of the bar 9 to firmly hold said bar from longitudinal movement. On the upper edge of the bar 9 is a rigid boss 13, provided with a conical socket 14. In this socket the cone 15 at the lower end of the cylinder 7 rests.

The cylinders 7 and 8 are provided, respectively, with central supporting-tubes $7^a$ and $8^a$, and it is to the tube $7^a$ that the cone 15 is attached. The tube $8^a$ has attached to its lower end a cone 16, that fits in a socket of a movable socket-piece 17, resting on the bar 9. The socket-piece 17 has a non-circular lower side that conforms to the upper surface of the non-circular bar 9. By this arrangement the socket-piece is prevented from turning upon said bar in its movement thereon, while it is free to move upon the bar.

18 designates a spring that bears against the side of the socket-piece 17, the tension of which is governed by a set-screw 19, that passes through the box 11 and bears against the spring and holds it pressed forward to the socket-piece.

The upper end of the tube $7^a$ has connected to it a tube 20, the lower end of which is enlarged, and has on its exterior a worm 21. The upper end of the tube 20 extends into the chamber 5 to convey the filtered water thereto from the interior of the filtering-cylinder 7, the water passing from the interior of the cylinder through the perforations 22 in the under side of the tube 20, where it faces the cylinder.

23 designates a tube attached to the upper end of the tube $8^a$, the lower end of which is enlarged and provided with perforations 24, opening into the interior of the cylinder 8. The exterior of the enlarged end of the tube 23 is formed with a worm 25.

26 designates a shaft mounted in the tank 1 and provided with worms 27 and 28, adapted to engage, respectively, with the worms 21 and 25, and by reason of such engagement to turn the cylinders 7 and 8 against each other and scour them for the purpose of removing from them the accumulations of slime, &c., by which the pores of the cylinders become choked, which prevents the filtration of water continuing.

The shaft 26 may be turned by hand by a crank 29, or it may be turned in any other suitable manner, either manually or by mechanical means.

30 designates a sliding bar the ends of which are supported in boxes 31 and 32, and in the box 32, bearing against the end of the bar, is a spring 33, held forward by a set-screw 34. The bar 30 is provided with a vertical hollow extension 35, that fits tightly over the tube 23, and at the upper end of the extension 35 is a nipple 36, that receives one end of a flexible tube 37, the opposite end of which extends through an opening in the cap-plate 4 into the chamber 5. By this means communication from the tube 23 to the chamber 5 is had for the conveyance of the filtered water.

The bar 30 is provided with a longitudinal slot 38, which slot receives the tube 20 and permits of the longitudinal movement of the bar 30 in the sidewise movement of the cylinder 8.

The operation of the filter is as follows: The water-supply enters the tank 1 through the inlet 2 and is by pressure forced through the filter-cylinders and thence through the tubes 20 and 23 to the chamber 5, from which it is conveyed through the outlet-pipe 6. When the filter is to be cleaned, the shaft 26 is turned, which revolves the worms 27 and 28, and these worms being in engagement with the worms 21 and 25 the filtering-cylinders are simultaneously revolved and their surfaces are retained in contact with each other by reason of the cylinder 8 being adjustable sidewise with relation to the other cylinder. In the rubbing of the surfaces of the cylinders against each other a portion of the porous substance of which the cylinders are composed is ground off by frictional contact and the accumulations of mud, slime, or other foreign matter are removed from the cylinders, thereby leaving the cylinders with open pores for the free passage of water therethrough.

I claim as my invention—

1. In a water-filter, the combination of a tank, a pair of hollow, porous filtering-cylinders revolubly mounted in said tank arranged with their peripheries in contact with each other, and means arranged to revolve said cylinders simultaneously, substantially as and for the purpose set forth.

2. In a water-filter, the combination of a tank, a pair of hollow, porous filtering-cylinders revolubly mounted in said tank and arranged with their peripheries in contact with each other, one of said cylinders being held from sidewise movement, and the other cylinder being arranged to be automatically pressed forward into contact with said first-mentioned cylinder, and means arranged to revolve said cylinders simultaneously, substantially as and for the purpose set forth.

3. In a water-filter, the combination of a tank, a pair of hollow porous filtering-cylinders revolubly mounted in said tank and arranged with their peripheries in contact with each other, one of said cylinders being held from sidewise movement, and the other movably mounted with respect to the first, springs arranged to press said movably-mounted cylinder toward the other cylinder, and means arranged to revolve said cylinders, substantially as and for the purpose set forth.

4. In a water-filter, the combination of a tank, a pair of filtering-cylinders revolubly mounted in said tank in contact with each other, a worm carried by each cylinder, an operating-shaft, and worms carried by said shaft arranged to engage with the worms carried by said cylinders, substantially as and for the purpose set forth.

5. In a water-filter, the combination of a tank, a pair of filtering-cylinders revolubly mounted in said tank in contact with each other, a worm carried by each cylinder, an operating-shaft, worms carried by said shaft arranged to engage the worms carried by said cylinders, and means arranged to press one of said cylinders forward against the other cylinder, substantially as and for the purpose set forth.

6. In a water-filter, the combination of a tank, a pair of filtering-cylinders revolubly mounted in said tank, one of said cylinders being held from sidewise movement, and the other being arranged to be moved toward the first, a tube leading from the first cylinder to an exit from the tank, a tube connected to the other cylinder, a movable bar attached to said tube, and having a hollow extension surrounding the tube, and a flexible tube forming a connection between said extension and the exit from the tank, substantially as and for the purpose set forth.

W. F. STEWART.

In presence of—
E. S. KNIGHT,
N. FINLEY.